United States Patent [19]

Cassarly et al.

[11] Patent Number: 5,636,915
[45] Date of Patent: Jun. 10, 1997

[54] HIGH BRIGHTNESS PROJECTION LIGHTING SYSTEM

[75] Inventors: William J. Cassarly, Richmond Heights; John M. Davenport, Lyndhurst; Richard L. Hansler, Pepper Pike; Richard C. Nagle, Middleburg Heights, all of Ohio

[73] Assignee: General Electric Company, Schenectady, N.Y.

[21] Appl. No.: 492,358

[22] Filed: Jun. 19, 1995

Related U.S. Application Data

[63] Continuation of Ser. No. 151,317, Nov. 12, 1993, abandoned.

[51] Int. Cl.⁶ .......................................................... F21V 8/00
[52] U.S. Cl. ............................ 362/32; 362/328; 362/298; 362/299; 362/346
[58] Field of Search ........................ 362/263, 26, 31, 362/32, 328, 339, 299, 298, 285, 331, 346, 347; 385/31, 33, 901

[56] References Cited

U.S. PATENT DOCUMENTS

| | | | |
|---|---|---|---|
| 2,932,294 | 4/1960 | Fourestier et al. | 362/32 X |
| 4,432,039 | 2/1984 | Cibie | 362/328 X |
| 4,539,625 | 9/1985 | Bornstein et al. | 362/31 X |
| 4,733,332 | 3/1988 | Yamashita et al. | 362/32 |
| 4,996,632 | 2/1991 | Aikens | 362/31 X |
| 5,058,981 | 10/1991 | Umegaki et al. | 385/33 X |
| 5,253,312 | 10/1993 | Payne et al. | 385/901 X |
| 5,278,731 | 1/1994 | Davenport et al. | 362/32 |
| 5,295,047 | 3/1994 | Windross | 362/31 X |

Primary Examiner—Ira S. Lazarus
Assistant Examiner—Thomas M. Sember
Attorney, Agent, or Firm—George E. Hawranko

[57] ABSTRACT

A light source and optical delivery arrangement for use with a projection lighting system as may be used in the stage and studio fields, includes a high brightness light source which achieves a light output in excess of 4000 lumens at a power rating of approximately 60 watts and wherein such efficiency is achieved in conjunction with a rated life of greater than about 4000 hours for such light source. The light source is disposed at the first optical focal point of an ellipsoidally shaped reflector with an input end of an optical coupler disposed at the second optical focal point of the reflector in order to receive the light output from the light source. The optical coupler member has a cross-sectional surface area which is polygonal in shaped and is effective so as to provide a light output therefrom which is essentially uniform in terms of color and intensity. A prismatic member is disposed on the optical coupler member for re-directing the light output into a lens member. The lens member is effective for shaping the light output into the desired beam pattern.

11 Claims, 4 Drawing Sheets

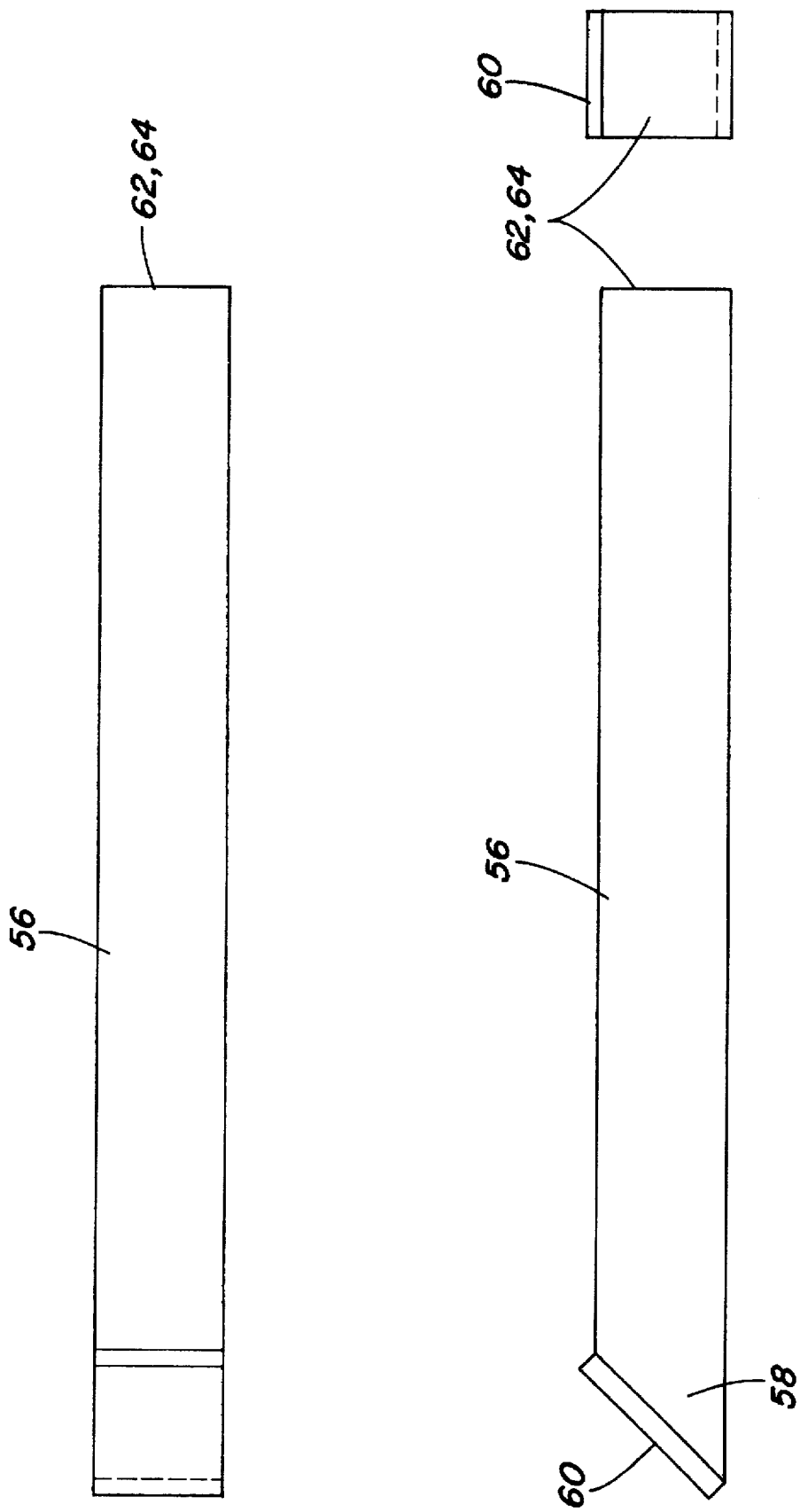

HIGH BRIGHTNESS PROJECTION LIGHTING SYSTEM

This application is a continuation of application Ser. No. 08/151,317, filed Nov. 12, 1993 now abandoned.

FIELD OF THE INVENTION

This invention relates to a high brightness projection lighting system as may be utilized in the field of stage and studio lighting for instance. More particularly, this invention relates to such a lighting system as utilizes a high brightness light source having improved energy efficiency and life expectancy characteristics, in conjunction with an efficient optical delivery arrangement that allows for the optimum coupling of light output from the light source through the lens of the projection lighting system.

BACKGROUND OF THE INVENTION

In the field of stage and studio lighting for instance, or in any projection lighting application such as flood or spot lighting systems, it is necessary to deliver a high brightness light output to a particular area at a distance from the projection system. In such an application, there must be sufficient light output to insure that the object or person on the stage for instance is clearly displayed. To date, such a projection lighting system has typically utilized a light source such as a high intensity discharge light source of approximately 200 Watts or greater for small, portable projection devices. In addition to requiring a high amount of energy to power such a light source, the typical lamp utilized for this purpose would have a rated life of approximately 250 hours. An example of such a projection lighting device can be found for example in a product offering by the Mole-Richardson Company as their Spot-to-Flood Projection Lighting Device, Model No. 6191. In such a device, the light source is provided by OSRAM Lighting Company by their 200 Watt, HMI Metallogen (R) Lamp, which as previously discussed, is limited in terms of energy efficiency and rated life. Additionally, such a high wattage light source generates a significant amount of heat as compared to a lower wattage device of perhaps 50 to 75 watts. It would therefore be advantageous to the field of projection lighting if a light source could be provided that utilized a more energy efficient light source which not only exhibited significantly greater temperature performance characteristics relative to the higher wattage lamps, but also provided a significant extension in the rated life of such lamp, such as for instance, a rated life in excess of 5000 hours which is 20 times that of the light source presently in use.

Another problem with the prior art projection lighting system such as defined above relates to the need to mask off certain portions of the projected light image so as to eliminate the appearance of any color separation in the light output. In other words, the presently known systems exhibit a deficiency in the area of spatial separation of the light output. The image of the light output of known light sources will exhibit a center, high intensity region that is white in color with a outer, less intense region which is red in color. As such, since it is desired to project only the high intensity, white center region to the area of illumination, a masking device is typically used to block the red, outer region of the light output. Such a masking operation has been found to be inefficient because of the elimination of what may otherwise be usable light output (the outer region) and in addition, because the light output of a typical high intensity discharge lamp used in projection lighting devices is subject to wandering of the arc discharge within the arc chamber, the white center region can be displaced by the red outer region with such red outer region then being projected through the mask. Accordingly, it would be desirable if a light source and light delivery arrangement could be provided that would utilize as much of the light output from the source as possible without experiencing the problem of spatial variation or the appearance of a color variation at the point of illumination.

One approach to substantially reducing the effects of color variation in the image of the light output from a high intensity light source can be found in U.S. Pat. application Ser. No. 07/859,179, filed on Mar. 27, 1992 by Davenport et al. and assigned to the same assignee as the present invention. In this application, a polygonal shaped optical coupling device is disclosed having the properties of uniform light output in terms of color and intensity. In utilizing such an optical coupling device for a projection lighting system as used in the stage and studio field however, it is necessary to consider the size constraints to a system that is intended to be hand-held and portable. Therefore, any design of an improved projection lighting device having a uniform color output should provide a physical configuration that does not increase the dimensions of housing components presently used for existing projection systems. Such a physical size consideration may require the use of light turning elements that could manipulate the light output so as to be coupled in as compact a space as possible. It should also be noted however, that in such light turning applications, there is a possibility that the coupling efficiency could be sacrificed given that for every bounce of light output that occurs, a measurable light loss is associated therewith. Accordingly, it would be further advantageous if a light re-directing arrangement could be included that not only allowed for the use of an improved light source, delivery arrangement in an existing size housing, but did not result in a considerable loss of light output in performing such light re-directing.

SUMMARY OF THE INVENTION

The present invention provides a light source and light delivery configuration for use with a projection lighting system as may be applicable to the stage and studio field wherein the light source is provided by a highly energy efficient light source which is compact in size and which exhibits a life expectancy rating in excess of approximately 5000 hours. This light source and delivery configuration further provides the additional benefits of achieving a light output which is essentially uniform in color and intensity even in conditions where the arc discharge may be subjected to conditions which cause such discharge to move from its central position within the arc chamber. This light source, delivery configuration further achieves all of the above benefits in a size package that is readily adaptable to existing housings which are intended to be portable and easy to handle.

In accordance with the provisions of the present invention, there is provided, in a projection lighting system effective for projecting a light output having a predetermined beam pattern to a desired location, a light source and delivery arrangement which includes a high brightness light source effective for producing the necessary light output. The light source is disposed at a first optical focal point associated with a curved reflector and is mounted in such reflector so as to be oriented in a vertical manner. An optical coupler member disposed at a second optical focal point associated with the curved reflector is receptive of the light output from the light source, reflector member configuration. The optical coupler member is constructed so as to have a cross-sectional surface area which is polygonally shaped thereby resulting in the light output therethrough exhibiting a substantially uniform color and intensity characteristics across such surface area. A lens member spaced apart from the optical coupler member receives the light output therefrom and is effective for forming such light output into the predetermined beam pattern. The lens member is oriented so as to output such beam pattern in a direction different from the direction which the light is output from the light source, reflector configuration. A prismatic member is disposed on one end of the optical coupler member and is effective, by means of a reflective surface disposed thereon, so as to re-direct the light output from the light source into a direction coincident with the orientation of the lens member.

In one embodiment of the invention, the optical coupler member is disposed along the longitudinal axis of the light source and the prismatic member is disposed at the output end of the optical coupler member. It is also possible to orient the optical coupler member so as to be at an angle perpendicular to the longitudinal axis of the light source and to dispose the prismatic member at the input end of the optical coupler member.

BRIEF DESCRIPTION OF THE INVENTION

In the following detailed description, reference will be made to the attached drawings in which.

FIG. 4 includes three elevational views of the optical coupler member utilized in the light source and delivery arrangements of the present invention.

DETAILED DESCRIPTION OF THE INVENTION

Figure 1:
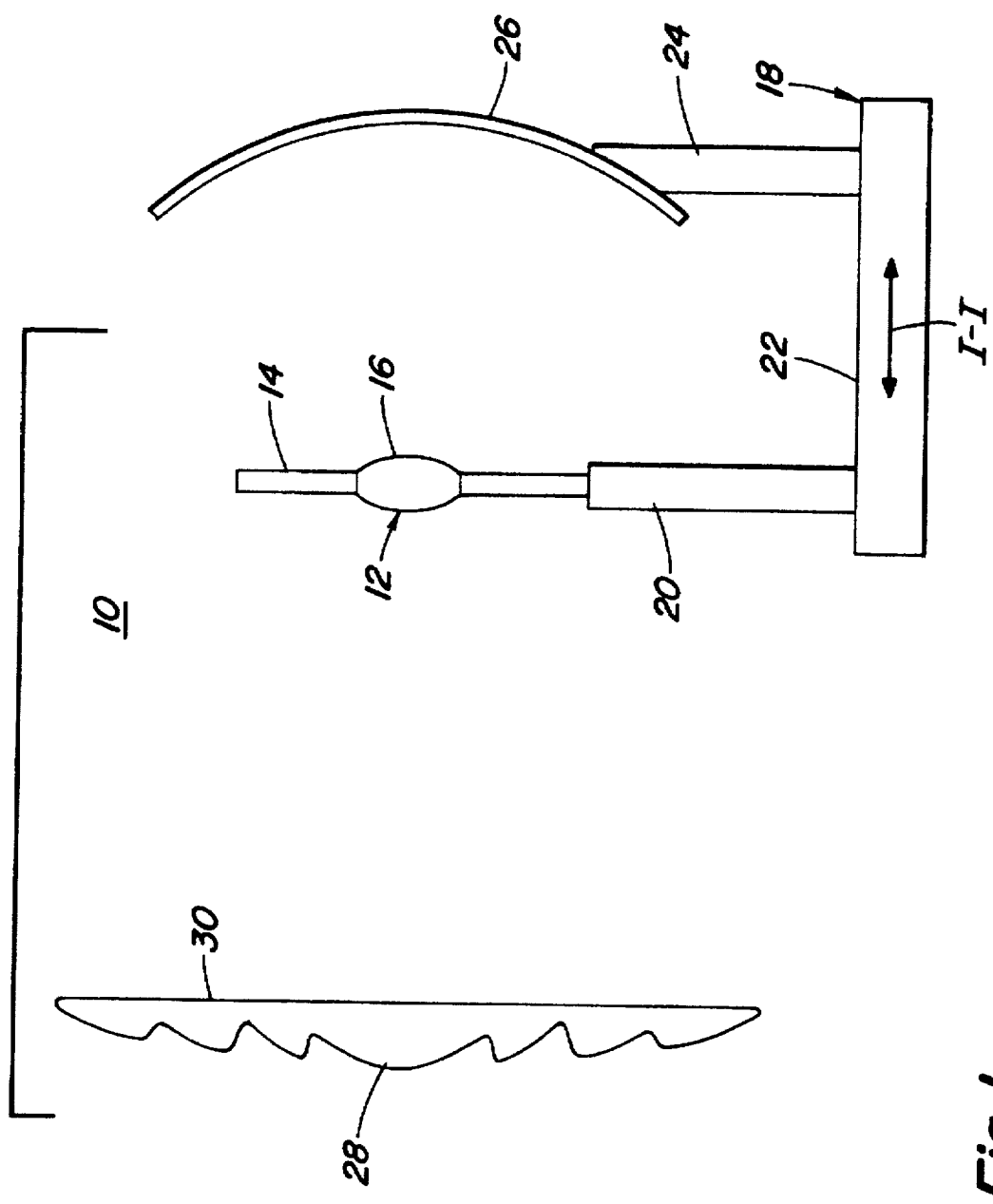
FIG. 1 is an elevational view in section of a light source and delivery arrangement for a projection lighting system constructed in accordance with the teachings of the prior art.

As seen in FIG. 1, the light source, delivery arrangement 10 typically provided in existing projection lighting systems such as are used in stage and studio applications, includes a light source 12 which is constructed having a double ended lamp envelope 14 with a center bulbous chamber 16 in which an arc discharge can be generated to provide the necessary light output. The light source 12 can be energized in a conventional manner by way of lead wires (not shown) which are typically connected to each of the ends of the lamp envelope 14 and which couple energy from a ballast circuit (not shown) to power the light source 12. In the projection system for which the prior art light source, optics arrangement 10 is applied, the light source 12 can be mounted in a vertical orientation on a movable support structure 18.

The movable support structure 18 includes a first support arm 20 on which the light source 12 is mounted, a base portion 22, and a second support arm 24 on which a parabolic reflector 26 is disposed. The light source 12 will be mounted on the support structure 18 so as to reside at the optical focal point of parabolic reflector 26. The light source 12, reflector 26 and support structure 18 can be moved laterally in the direction of arrows I—I shown in the figure toward or away from a fresnel lens member 28. In this manner, the projection system can be changed from a spot application to a floodlight application, with the movement to the left resulting in a floodlight application and movement to the right-hand position resulting in a spotlight application. A conventional housing structure (not shown) is typically used to contain the light source and delivery configuration 10 of FIG. 1 as well as to provide an adjustment mechanism such as a screw drive for moving support structure 18 to allow adjustment from the spot to the flood operation and vice-versa.

As previously discussed relative to the deficiencies of the prior art projection lighting systems, the structure 10 of FIG. 1 utilizes a light source 12 which operates at a power rating of 200 watts and has a rated life of 250 hours. Moreover, because of the spatial variations of the light output, that is, the existence of a center white spot and an outer red region, where such white and red regions can alter in position relative to one another, it is necessary to employ a mask (not shown) in connection with the lens member 26. It is also possible to provide stipples 30 on one surface of lens member 26 to perform some measure of mixing of light output through the lens member 26.

Figure 2:
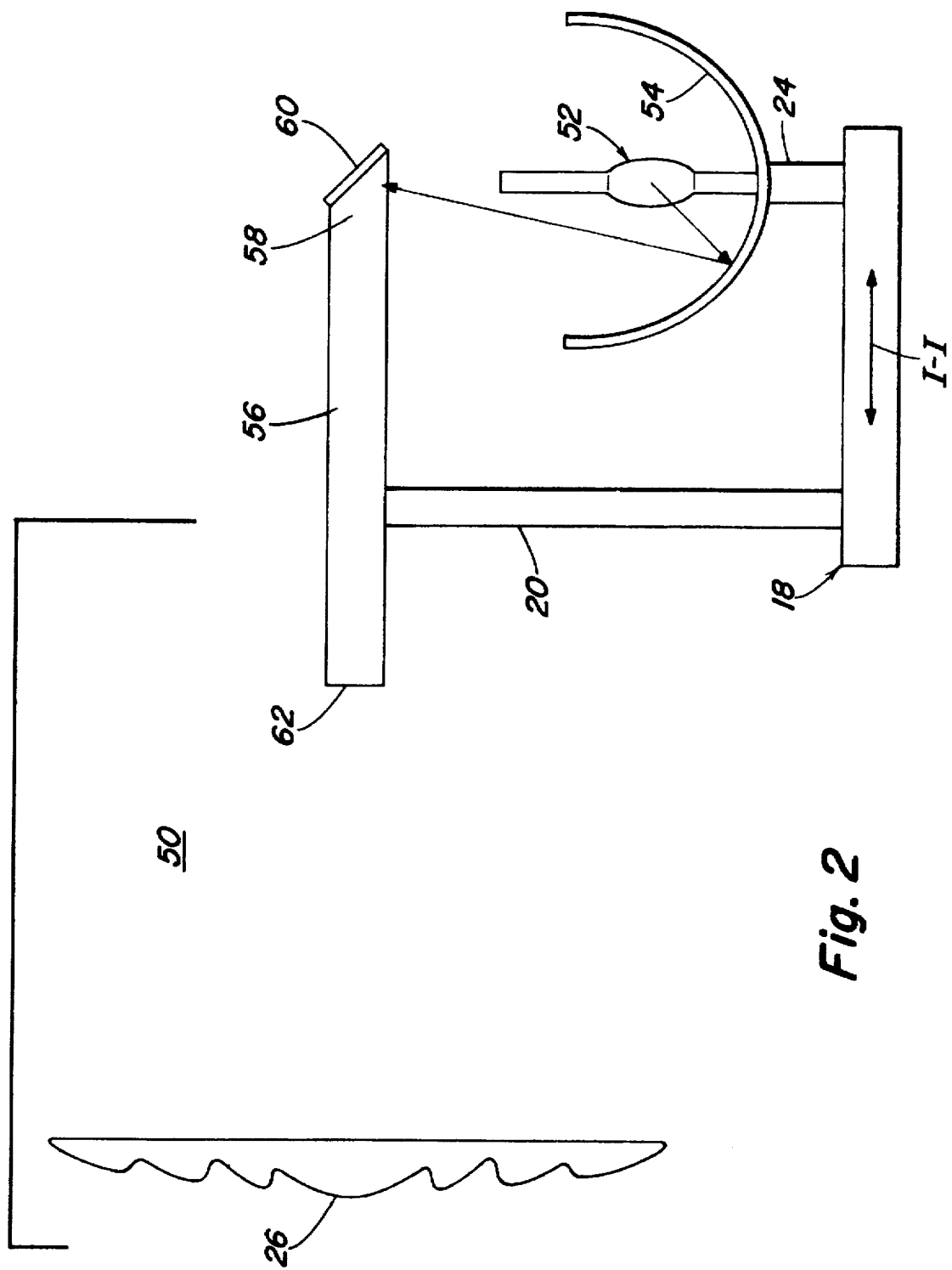
FIG. 2 is an elevational view in section of a light source, delivery arrangement for a projection lighting system constructed in accordance with a first embodiment of the present invention.

A new and novel light source and delivery arrangement 50 which solves the above described problems, can be seen in FIG. 2 wherein a high intensity discharge lamp 52 is mounted in a vertical orientation within an ellipsoidally shaped reflector member 54. The discharge lamp 52 is a high brightness lamp capable of producing at least 4000 lumens of light output at a rated power of approximately 60 watts. Additionally, the light source 52 utilized in the present invention exhibits a rated life expectancy in excess of 5000 hours. For a more detailed description of discharge lamp 52, reference is hereby made to U.S. Pat. No. 5,239,230 issued to Mathews et al. on Aug. 24, 1993, assigned to the same assignee as the present invention and herein incorporated by reference. As seen in FIG. 2, the ellipsoidal reflector member 54 is mounted so as to have an open end facing in an upward direction. The discharge lamp 52 is mounted within the reflector member 54 at approximately the first optical focal point associated with the reflector member 54.

Disposed approximately at the second optical focal point associated with reflector member 54 is an optical coupler member 56 which is mounted in a horizontal orientation. In order to convert the light output from the light source 52, reflector 54 configuration from its vertically projecting orientation into a horizontal one coincident with the orientation of the optical coupler member 56, the optical coupler member 56 must re-direct the light output by approximately 90 degrees. This light re-direction operation is performed by means of a prismatic portion 58 mounted in this instance at the input end of optical coupler member 56. To assist in the light re-direction operation, a mirror member 60 is mounted on the prismatic portion 58. Of course, it can be realized that the reflective properties of mirror member 60 could be equally achieved by means of a reflective coating placed on this surface, and it is intended that such modification is within the scope of the present invention. As will be described in further detail with respect to FIG. 4, the optical coupler member 56 has a cross-sectional surface area which is polygonal in shape. Output end 62 of optical coupler member 56 is aimed at the lens member 26 so as to achieve the same beam pattern output as is provided by the conventional projection lighting system.

Both the optical coupler member 56 and the light source 52, reflector 54 arrangement are mounted using support arms 20 and 24 to the support structure 18 which is movable in the same manner as described with respect to FIG. 1.

Figure 3:
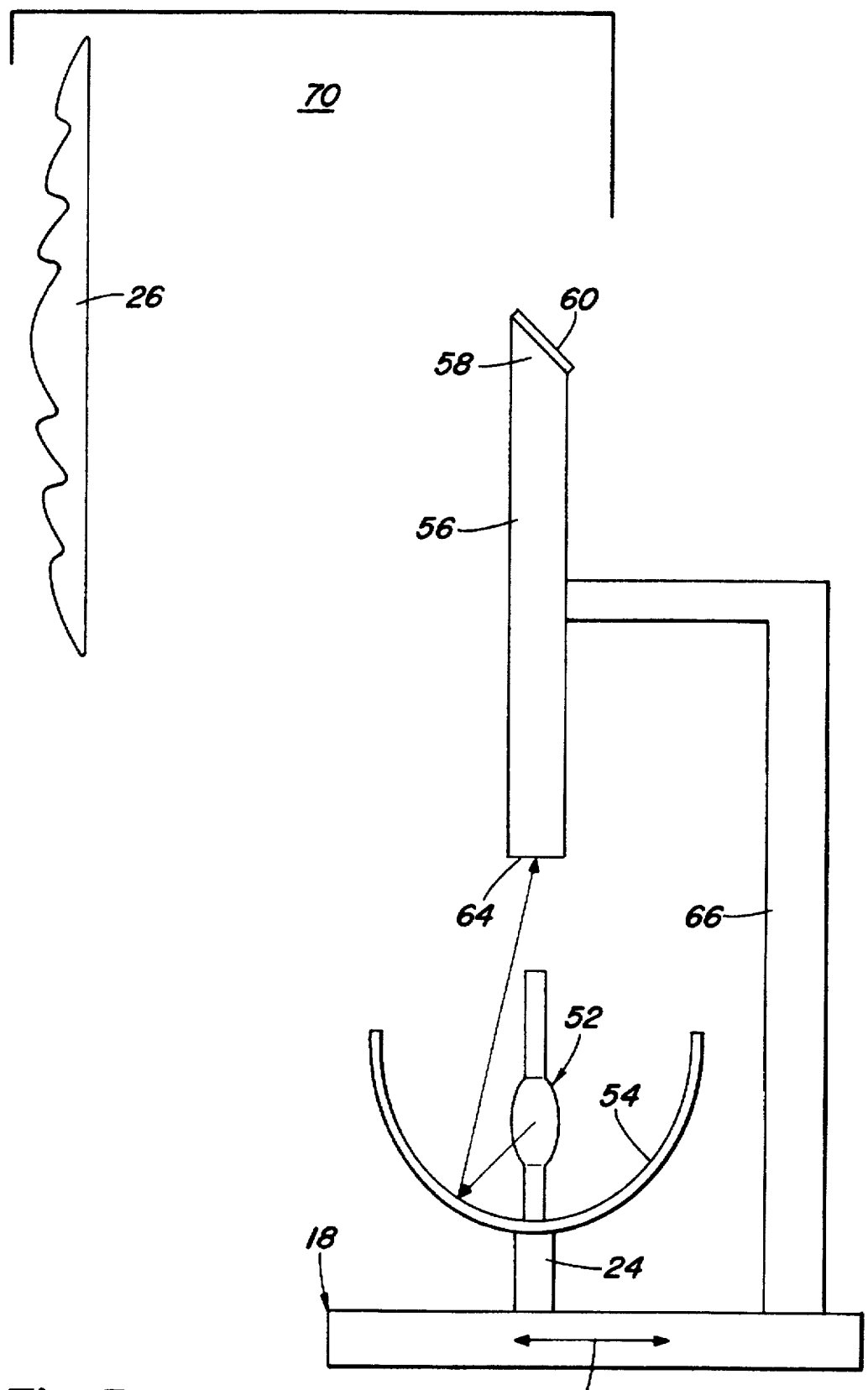
FIG. 3 is an elevational view in section of a light source, delivery system for a projection lighting system constructed in accordance with a second embodiment of the present invention.

As previously discussed relative to the problems of incorporating a light re-directing arrangement in a projection lighting system for use in the stage and studio field for instance, it is a requirement that space/size constraints not be exceeded. To this end, an alternate light source, delivery arrangement 70 is shown in FIG. 3 which achieves the same performance characteristics as that of arrangement 50 shown in FIG. 2 in terms of energy efficiency, rated life and quality of light output, can be realized in a smaller space than that shown in FIG. 2. In the arrangement 70 of FIG. 3, the light source 52 and reflector 54 configuration is the same as that of FIG. 2 wherein the discharge lamp 52 is vertically mounted at the first optical focal point of reflector 54. In this arrangement, the optical coupler member 56 is also mounted in a vertical manner with an input end 64 disposed at approximately the second optical focal point of the reflector 54. To achieve this vertical orientation of optical coupler member 56, an L-shaped support member 66 is provided as part of the support structure 18. Moreover, by the use of a vertical orientation of the optical coupler member 56, in order to achieve the necessary light re-direction operation that directs the light output into lens member 26, the prismatic portion 58 and mirror member 60 are mounted at the output end of the optical coupler member 56. By this vertical orientation of optical coupler member 56, it can be appreciated that the length of the overall discharge lamp 52, reflector member 54 and optical coupler member 56 can be shortened in relation to that shown in FIG. 2, yet still result in the same efficiency, life and optical improvement benefits as previously discussed relative to FIG. 2.

As seen in FIG. 4, the optical coupling member 56 is illustrated as having a cross-sectional surface area which is square in shape. It should be realized that other polygonal surfaces would be equally effective in achieving the optical benefits of this square shape. As discussed in previously referenced U.S. Pat. application Ser. No. 07/859,179, a polygonally shaped optical coupler provides for a light output which is uniform both in terms of color and intensity. By the shaping of the sides of the optical coupler 56 in a straight configuration, the present invention provides for an averaging to occur within the optical coupler that would eliminate any problem of movement of the center, white high intensity portion of the light output relative to the outer, red region. In this manner, the light output that is presented to lens member 26 will be uniform in color and intensity and therefore, will translate to a beam pattern output from the projection lighting system which does not exhibit color variations as does the prior art system. In practice, the optical coupler member 56 and the prismatic portion 58 are integrally formed of the same light transmissive material. Additionally, the outer surfaces of the sides of the optical coupler member 56 are polished so as to allow for the total internal reflectance of the light rays passing therethrough. As seen in the end view of the optical coupler member 56, because the coupler member 56 can be oriented in either direction as illustrated in FIGS. 2 and 3, the end without the prismatic portion 58 formed thereon can be either the input end or the output end.

Although the hereinabove described embodiments of the invention constitute preferred embodiments, it should be understood that modifications can be made thereto without departing from the scope of the invention as set forth in the appended claims. For example, although optical coupler member 56 has been illustrated as being of a straight configuration, it is possible to taper the ends and yet maintain the polygonal shape of the cross-sectional area. Additionally, an aluminum coating can be disposed on the prismatic surface in place of mirror member 60 and still achieve the same light re-directing properties as if a mirror member were utilized. Furthermore, it would also be possible to re-orient the reflector member so that its optical axis is other than vertically oriented. For example, if the reflector member were oriented at a 45° angle, the optical coupler and prismatic member arrangement could still provide the necessary light re-directing operation to communicate the light output to the lens.

We claim:

1. In a projection lighting system effective for projecting a light output having a predetermined beam pattern to a desired location, a light source and delivery arrangement comprising:

a high brightness light source effective so as to produce such light output;

a curved reflector member having a first optical focal point associated therewith, said light source being disposed in a vertical orientation and approximately at said first optical focal point;

an optical coupler member having an input end receptive of such light output and disposed approximately at a second optical focal point associated with said reflector member, said optical coupler member being constructed having a cross-sectional surface area which is polygonal in shape, said optical coupler member further having and output end associated therewith and further wherein said optical coupling member has a length associated therewith which is substantially greater in value than a corresponding value associated with said cross-sectional surface area, said polygonal shape and said length of said optical coupler member, in cooperation, being effective so as to provide a light output through said output end, said light output being substantially uniform in terms of color and intensity;

a lens member spatially displaced from said optical coupler member, said lens member being oriented so as to output light therefrom in a direction different that the direction at which the optical axis of said reflector member is directed, said lens member further being effective so as to shape said light output into such predetermined beam pattern for delivery to such desired location; and, a prismatic member formed on one of said input and output ends of said optical coupler member, said prismatic member being effective so that light output from said optical coupler member is re-directed thereby in a direction coincident with the orientation of said lens member.

2. A light source and delivery arrangement as set forth in claim 1 wherein said curved reflector member is an ellipsoidally shaped reflector.

3. A light source and delivery arrangement as set forth in claim 1 wherein said light source is a high intensity discharge lamp having a light output of greater than approximately 4000 lumens and having a rated life expectancy of greater than about 3000 hours.

4. A light source and delivery arrangement as set forth in claim 1 wherein said lens member is a fresnel lens and has a plurality of stipples formed on one surface thereof so as to be effective in smoothing the light output transmitted therethrough.

5. A light source and delivery arrangement as set forth in claim 1 wherein said cross-sectional surface area of said optical coupling member is constructed in the shape of a square.

6. A light source and delivery arrangement as set forth in claim 1 wherein said prismatic member is effective so as to re-direct light output input thereto by approximately 90 degrees.

7. A light source and delivery arrangement as set forth in claim 1 wherein said optical coupler member is disposed along the same longitudinal axis as said light source and further wherein said prismatic member is disposed on said output end of said optical coupler member.

8. A light source and delivery arrangement as set forth in claim 1 wherein said optical coupler member is disposed on an axis which is essentially perpendicular to the longitudinal axis of said light source and further wherein said prismatic member is disposed on said input end of said optical coupler member.

9. A light source and delivery arrangement as set forth in claim 1 further comprising a reflective surface disposed on one side of said prismatic member.

10. A light source and delivery arrangement as set forth in claim 9 wherein said reflective surface of said prismatic member is a cold mirror element mounted on said prismatic member.

11. A light source and delivery arrangement as set forth in claim 1 wherein said prismatic member is integrally formed with said optical coupler member.

* * * * *